(12) United States Patent
Gilbert

(10) Patent No.: US 11,415,234 B2
(45) Date of Patent: Aug. 16, 2022

(54) ADJUSTABLE VALVE CORE

(71) Applicant: Schrader-Bridgeport International, Inc., Altavista, VA (US)

(72) Inventor: Major H. Gilbert, Gladys, VA (US)

(73) Assignee: Schrader-Bridgeport International, Inc., Altavista, VA (US)

( * ) Notice: Subject to any disclaimer, the term of this patent is extended or adjusted under 35 U.S.C. 154(b) by 0 days.

(21) Appl. No.: 17/039,164

(22) Filed: Sep. 30, 2020

(65) Prior Publication Data
US 2022/0099201 A1    Mar. 31, 2022

(51) Int. Cl.
*F16K 15/06*    (2006.01)

(52) U.S. Cl.
CPC .................................. *F16K 15/063* (2013.01)

(58) Field of Classification Search
CPC ............. F16K 15/063; F16K 2200/502; F16K 2200/501; F16K 2200/50; F16K 2200/30
USPC ............................................. 137/542, 543.13
See application file for complete search history.

(56) References Cited

U.S. PATENT DOCUMENTS

| | | | |
|---|---|---|---|
| 217,745 A * | 7/1879 | Pringle | F16K 17/0433 137/469 |
| 274,787 A * | 3/1883 | Kilborn | F16K 15/063 137/542 |
| 1,337,462 A | 4/1920 | Marulli | |
| 2,797,704 A | 7/1957 | McDermott et al. | |
| 4,368,756 A * | 1/1983 | Carlson | F16K 15/06 137/541 |
| 4,955,407 A | 9/1990 | Inoue | |
| 4,979,721 A | 12/1990 | Gilbert | |
| 5,113,900 A | 5/1992 | Gilbert | |
| 5,226,445 A * | 7/1993 | Surjaatmadja | F16K 15/063 137/516.29 |
| 6,929,023 B2 | 8/2005 | Whitaker et al. | |
| 9,032,992 B2 | 5/2015 | Andersson | |
| 2005/0263187 A1 | 12/2005 | Jernigan et al. | |

* cited by examiner

*Primary Examiner* — P. Macade Nichols
(74) *Attorney, Agent, or Firm* — Crowell & Moring LLP

(57) ABSTRACT

A valve may include a valve body forming a central passage extending from a first side of the valve body to a second side of the valve body. A valve pin may be located within the central passage, where the valve pin includes a sealing head that selectively contacts a valve seat of the valve body to control flow of a fluid through the central passage. A spring may have a first end that is fixed relative to the valve pin. A spring seat may be fixed relative to a second end of the spring, where the spring is fixed relative to a calibration plunger, and where the calibration plunger is secured to a threadless calibration wall of the valve body via an interference fit.

19 Claims, 5 Drawing Sheets

ADJUSTABLE VALVE CORE

TECHNICAL FIELD

The present disclosure generally relates to valves and valve components that regulate the flow of fluid in at least one direction, such as components for a check valve or charge valve included in an air conditioning system.

BACKGROUND

Check valves, such as those used to connect a refrigerant source to an air conditioning system, are designed to prevent backward flow of a liquid. For example, when coupled to a refrigerant charging line, a check valve may allow flow of the refrigerant in only one direction. Typically, check valves have a valve body that defines an axially-oriented passageway (or "central passage"). An annular valve seat is disposed around the passageway, and a spring-loaded valve pin is mounted inside the central passage. The valve pin seats against the valve seat to prevent flow through the central passage when the check valve pin is closed, and it is spaced from the valve seat when the check valve is open to permit flow through the central passage.

The embodiments described herein are related to improved valve cores and other structures (and related methods) for calibrating or otherwise adjusting check valves and other valve types.

BRIEF DESCRIPTION OF THE DRAWINGS

The embodiments of the present disclosure may be better understood with reference to the following drawings and description. The components in the figures are not necessarily to scale, with emphasis instead being placed upon illustrating the principles of the present disclosure. Moreover, in the figures, like reference numerals designate similar or identical features.

DETAILED DESCRIPTION

Figure 1:
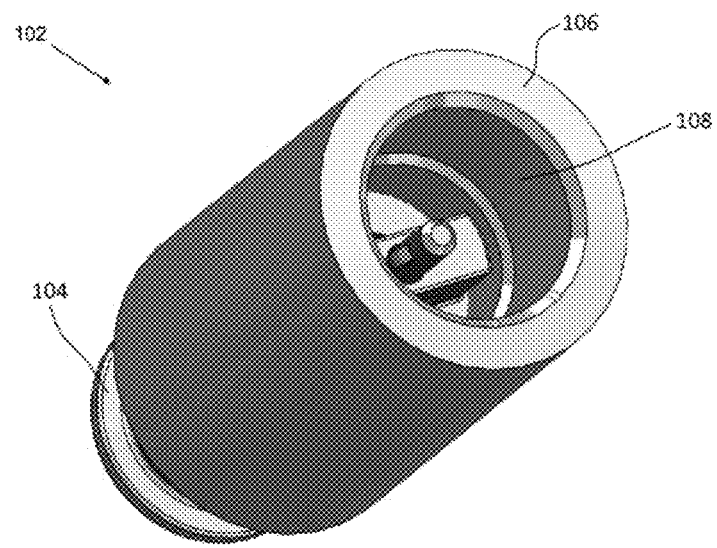
FIG. 1 is an illustration showing a perspective view of a check valve in accordance with certain aspects of the present disclosure.

Various aspects are described below with reference to the drawings in which like elements generally are identified by like numerals. The relationship and functioning of the various elements of the aspects may be better understood by reference to the following detailed description. However, aspects are not limited to those illustrated in the drawings or explicitly described below. It also should be understood that the drawings are not necessarily to scale, and in certain instances, details may have been omitted that are not necessary for an understanding of aspects disclosed herein, such as conventional fabrication and assembly.

FIG. 1 shows a perspective view of a valve 102. In this disclosure, the valve 102 is described as being used with an air conditioning system ("AC system"), particularly for providing communication between a charged refrigerant source and the tubing forming the primary refrigeration cycle. The valve 102 may be used for any other suitable application, particularly those where single-direction flow of a fluid (i.e., liquid or gas) is desired. In the depicted embodiment, the valve 102 includes a first side 104 designed to couple to the refrigerant source and a second side 106 designed to couple to the refrigeration cycle. During normal operation, refrigerant may flow into the first side 104, through a central passage 108, and out of the second side 106 (and/or vice versa).

Notably, at least certain portions of the valve 102, and potentially the entirety of the valve 102, may be threadless. For example, the first side 104 may act as a threadless male coupling (or alternatively a female coupling). During assembly into an air conditioning system, the first side 104 may be inserted into a first tubing component (e.g., in fluid communication with a charged refrigerant source). Similarly, the second side 106 may act as a threadless female coupling, or alternatively a male coupling, for receiving and securing to a second tubing component (e.g., in fluid communication with a refrigeration cycle). Alternatively, the body of the valve 102 may be formed integrally with one or more of the first tubing component and the second tubing components. Whether threads are used or not, the valve 102 may include wrench-receiving features on an outer surface (not depicted), which may facilitate the holding and maneuvering of the valve 102 during the assembly of an air conditioning system. Additional details of threadless valves (and related features) are described in U.S. patent application Ser. No. 16/540,297, filed Aug. 14, 2019, which is hereby incorporated by reference in its entirety.

Figure 2:
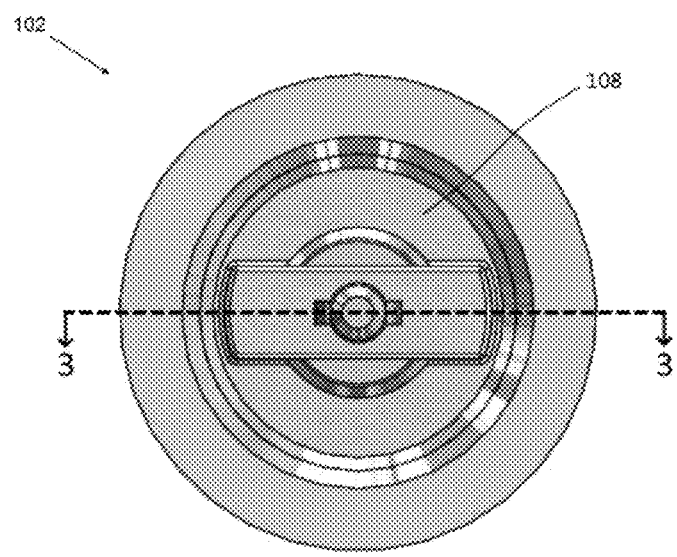
FIG. 2 is an illustration showing a front view of the check valve depicted in FIG. 1.
Figure 3:
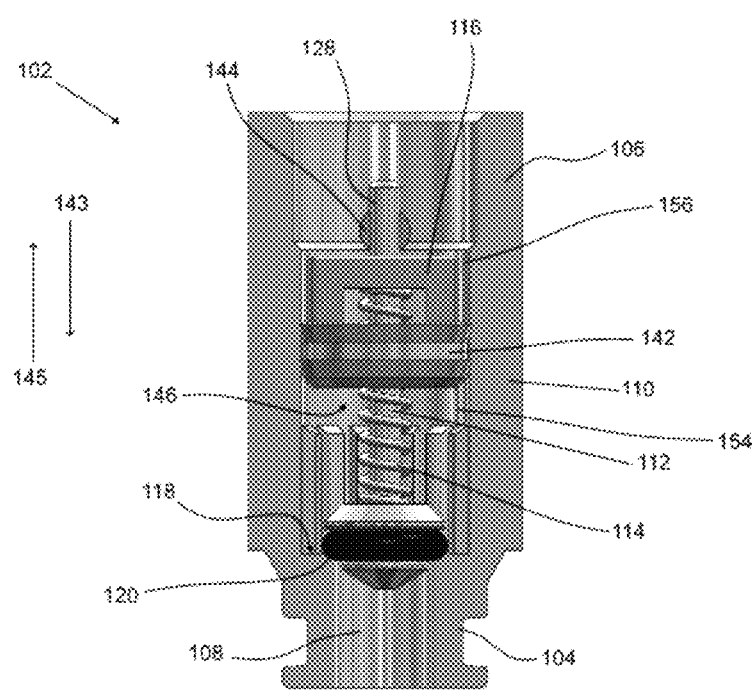
FIG. 3 is an illustration showing a section view of the check valve depicted in FIGS. 1-2 about section 3-3 (shown in FIG. 2).
Figure 5:
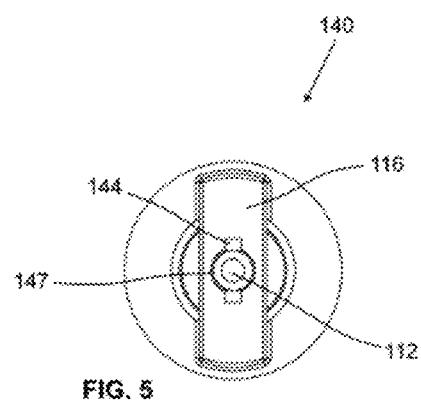
FIG. 5 is an illustration showing a front view of the valve core depicted in FIG. 4.
Figure 6:
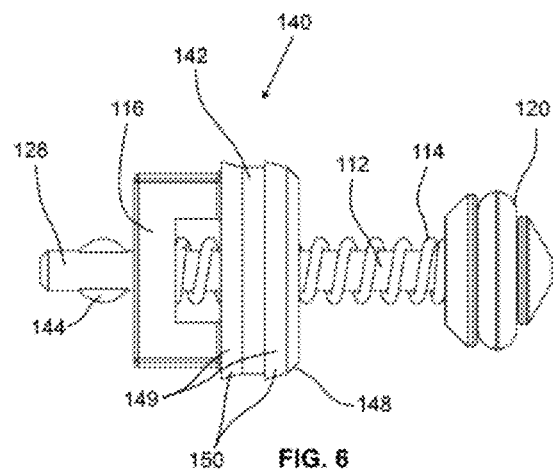
FIG. 6 is an illustration showing a side view of the valve core depicted in FIG. 4.
Figure 4:
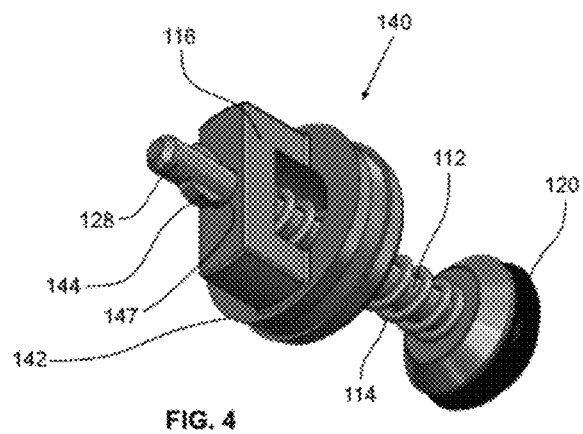
FIG. 4 is an illustration showing a perspective view of a valve core for use with the check valve depicted in FIGS. 1-3, where the valve core includes a calibration plunger and related components in accordance with certain aspects of the present disclosure.

FIG. 2 shows a front view of the valve 102, and FIG. 3 shows a section view about section 3-3 of FIG. 2. As shown in FIGS. 2-3, the valve 102 may generally include a valve body 110 that defines the central passage 108 and a valve pin assembly, depicted as a valve core 140, that fits at least partially inside the central passage 108 of the valve body 110. Various view of the valve core 140 in isolation are shown in FIGS. 4-6. While the valve body 110 is generally depicted in the figures as a stand-alone feature, it is contemplated that the valve body 110 may be integral with piping/tubing of the system (e.g., such that installation of the valve body 110 includes placing the valve body 110 directly into the piping/tubing of the system.

Referring to FIGS. 3-6, the valve core 140 may include a valve pin 112 (e.g., located within the central passage 108 when the valve 102 is assembled), a spring 114 that provides a spring force to the valve pin 112, and a spring seat 116 that retains the spring 114 (and thus the valve pin 112) in their operational positions. A sealing head 120 may be located on an end of the valve pin 112. At least one stop 144 may extend from the valve pin 112 such that the tail 128 of the valve pin 112 does not fit through an opening 147 of the spring seat 116, thereby controlling the maximum extension of the valve pin 112 from the spring seat 116 due to compression o of the spring 114. As discussed in more detail below, the valve core 140 may also include a calibration plunger 142 that is fixed to the spring seat 116. The calibration plunger 142 may include at least one opening such that it does not interrupt fluid communication through the central passage 108 when the valve is open.

The valve body 110 may have a valve seat 118, which may include a surface that is angled relative to the longitudinal direction of the central passage 108 and towards the sealing head 120 of the valve pin 112. To control fluid communication between the first side 104 of the central passage 108 and the second side 106 of the central passage 108, the valve pin 112 may be movable such that the sealing head 120 can be moved into and out of engagement (e.g., contact) with the valve seat 118. For example, when in an open, non-sealing state (not shown), the sealing head 120 may be spaced from the valve seat 118 such that fluid can pass between the sealing head 120 and the valve seat 118. By contrast, when the valve 102 is in a closed (sealing) state, the sealing head 120 may abut or contact the valve seat 118 (as shown in FIG. 3) such that fluid communication between the first side 104 and the second side 106 of the central passage 108 is interrupted. The valve pin 112 may be formed with any suitable material, such as a plastic material, a metal (e.g., brass), another suitable material, or a combination thereof. Optionally, the sealing head 120 may include a material that is relatively compliant (e.g., a rubber) relative to the remainder of the valve pin 112 such that the contact portion of the sealing head 120 compresses against the valve seat 118 for enhanced sealing. Alternatively, the valve pin 112 may be formed as a single unitary piece (e.g., having the same or similar exterior profile as the depicted two-piece version).

When the valve 102 is assembled, the spring 114 may influence the position of the valve pin 112 via potential energy stored in the spring 114. The spring 114 may be formed with any suitable material or combination of materials, such as a metal material (e.g., 302 stainless steel) or a non-metal material (e.g., a plastic). In the depicted embodiment, the spring 114 is a helical compression spring that exerts opposing forces on the sealing head 120 of the valve pin 112 and the spring seat 116. Since the valve pin 112 is fixed relative to the valve body 110 (as discussed in more detail below), the spring 114 causes a tendency for the sealing head 120 to abut the valve seat 118, absent other forces. Thus, in order for the valve 102 to move from the closed (sealing) state to the open (non-sealing) state, an external force must be present that acts on the valve pin 112. For example, when the valve 102 is designed to allow flow in only one direction, a pressure between the first side 104 and the second side 106 of the central passage 108 may cause the valve 102 to open (e.g., where the pressure difference is sufficient to overpower the spring 114, thereby moving the valve pin 112 away from the valve seat 118). Additionally or alternatively, a separate pin or other valve opening device may be used (not shown), which may be inserted through the first side 104 and placed into contact with the sealing head 120 to move the valve pin 112 away from the valve seat 118 (e.g., potentially allowing two-way flow through the valve 102). Such an embodiment may be advantageous where the valve 102 is used for both charging and discharging refrigerant and another fluid from a system under certain conditions.

The calibration plunger 142, which may be fixed to the spring seat 116 and generally responsible for locating the spring seat 116 in an appropriate placement within the central passage 108 of the valve body 110, may be secured to a corresponding calibration wall 146 of the valve body 110. At least during installation, the calibration plunger 142 may be movable in at least one direction relative to the calibration wall 146 of the valve body 110. This movement may alter the default spring compression of the spring 114, thereby changing the pressure differential required to open the valve. For example, as the calibration plunger moves closer to the first side 104 and closer to the valve seat 118, the pressure differential required to open the valve may increase (i.e., an amount corresponding to the spring constant of the spring 114 multiplied by the displacement of the spring seat 116).

As shown, the calibration plunger 142 may be threadless. For example, the calibration plunger 142 may secure to the calibration wall 146 via a press-fit engagement (also known as an interference fit engagement). Further, the calibration plunger 142 may be fixed to the spring seat 116 (e.g., via formation as an integral piece in certain embodiments). While the spring seat 116 extends away from the calibration plunger 142 in the depicted embodiment, this is not required. Because these components are fixed together, moving the calibration plunger 142 causes the spring seat 116 to move, and therefore moving the calibration plunger 142 towards the second side 106 of the valve body 110 will cause the spring 114 to compress (assuming the sealing head 120 is in abutment with the valve seat 118).

Referring to FIG. 6, the calibration plunger 142 may include an outer perimeter 148 that is configured to engage the calibration wall 146 of the valve body 110. To ensure a snug fit (e.g., that can withstand operational pressures and forces without plunger movement), the outer perimeter 148 may include a diameter that is substantially equal to, or slightly larger than, the inner diameter of the calibration wall 146. In some embodiments (including the depicted embodiment), the calibration plunger 142 may include a stopper 149 that has an angled surface 150 that may be angled relative to the longitudinal direction of the valve pin 112 at least when in an uncompressed state as shown in FIG. 3. As shown, the angled surface 150 may have a vertex that faces the first side 104. Optionally, two (or more) angled surfaces 150 may be included (as shown). The angled surface 150 may act as a barb that increases the force needed to move the calibration plunger 142 in one direction. For example, the angled surface 150 may cause the stopper 149 to have a larger diameter in the area closer to the second side 106 of the valve and a smaller diameter on the side closer to the first side 104 of the valve 102, which may gradually increase the force needed to push the calibration plunger 142 as it moves towards the first side 104 of the valve 100. Thus, during calibration, the calibration plunger 142 may be moved in a first direction 143 (FIG. 3) with relative ease, while the calibration plunger 142 provides sufficient resistance against the calibration plunger 142 from moving the opposite direction (second direction 145 shown in FIG. 3), which prevents operational pressures/forces experienced during operation of the valve 100 (from springs, fluid pressure, etc.) from moving the calibration plunger 142.

If included, the angled surface(s) 150 on the outer perimeter of the calibration plunger 142 may be formed unitarily with the remainder of the calibration plunger 142 (e.g., such that they include a common material with the remainder of the calibration plunger 142), but this is not required. For example, and as shown in the depicted embodiment, the angled surfaces 150 may be formed with a ring of rubber or another relatively-compliant material that extends around the outer perimeter 148 of the calibration plunger 142. Two such rubber rings are included in the depicted embodiment.

To assist in calibration, it is contemplated that the calibration wall 146 may have different diameters along its length (e.g., it may have a conical shape). Referring to FIG. 3, for example, a first side 154 of the calibration wall 146 may have a slightly smaller diameter than a second side 156 of the calibration wall 146. As a result, when installing the calibration plunger 142, the force needed to move the calibration plunger 142 may increase as the calibration plunger nears the first side 154 of the calibration wall 146. Advantageously, this feature may enhance the ability to precisely move the calibration plunger 142 to a particular location since it may be determined beforehand how much force to apply to the calibration plunger 142 for locating it in a target area (corresponding to a particular valve setting). To illustrate, when pressing the calibration plunger 142 into its operational position, a first constant force applied to the calibration plunger 142 in the first direction 143 may cause the calibration plunger 142 to move to a first location between the first side 154 and the second side 156 of the calibration wall 146. When the calibration plunger reaches the first location, the friction force between the calibration plunger 142 and the calibration wall 146 may be sufficient to prevent the calibration plunger 142 from moving any further in the first direction 143. A second force, being larger than the first force and applied in the same direction, may cause the calibration plunger 142 to move further to a second location between the first side 154 and the second side 156 of the calibration wall 146, where the second location is closer to the first side 154 and the first location is closer to the second side 156.

Optionally, the securement of the calibration plunger 142 to the valve body 110 may be enhanced via another suitable structure or method, such as via the use of an adhesive (e.g., LOCTITE®) at the place of contact. In a particular exemplary embodiment, an ultrasonic welding and/or another welding, friction, laser, or any/or any other suitable process may be used once the calibration plunger 142 is properly placed, whereby high-frequency ultrasonic acoustic vibrations are applied at least to the contact area between calibration plunger 142 of the valve core 140 and the calibration wall 146 of the valve body 110. These ultrasonic acoustic vibrations may form a solid-state weld or joint. Without limitation, an ultrasonic weld may be advantageous since such an embodiment does not require bolts, nails, soldering materials, adhesives, or any other external component(s) for securing the two unitary pieces together. Further, due to the low-temperature nature of ultrasonic welding, the temperature during assembly may remain below the melting point of the materials forming the valve core 140 and/or the valve body 110, thereby preventing undesirable deformation.

FIGS. 7-11 show another embodiment of a valve 202 and corresponding valve core 240. This embodiment may be used as an alternative to, or in addition to, the embodiment described above. However, where appropriate, features from this embodiment may be combined with the embodiment described above and/or other suitable embodiments. For example, the below-described threaded set screw 262 may be swapped with a press-fit plunger.

Figures 7, 8:
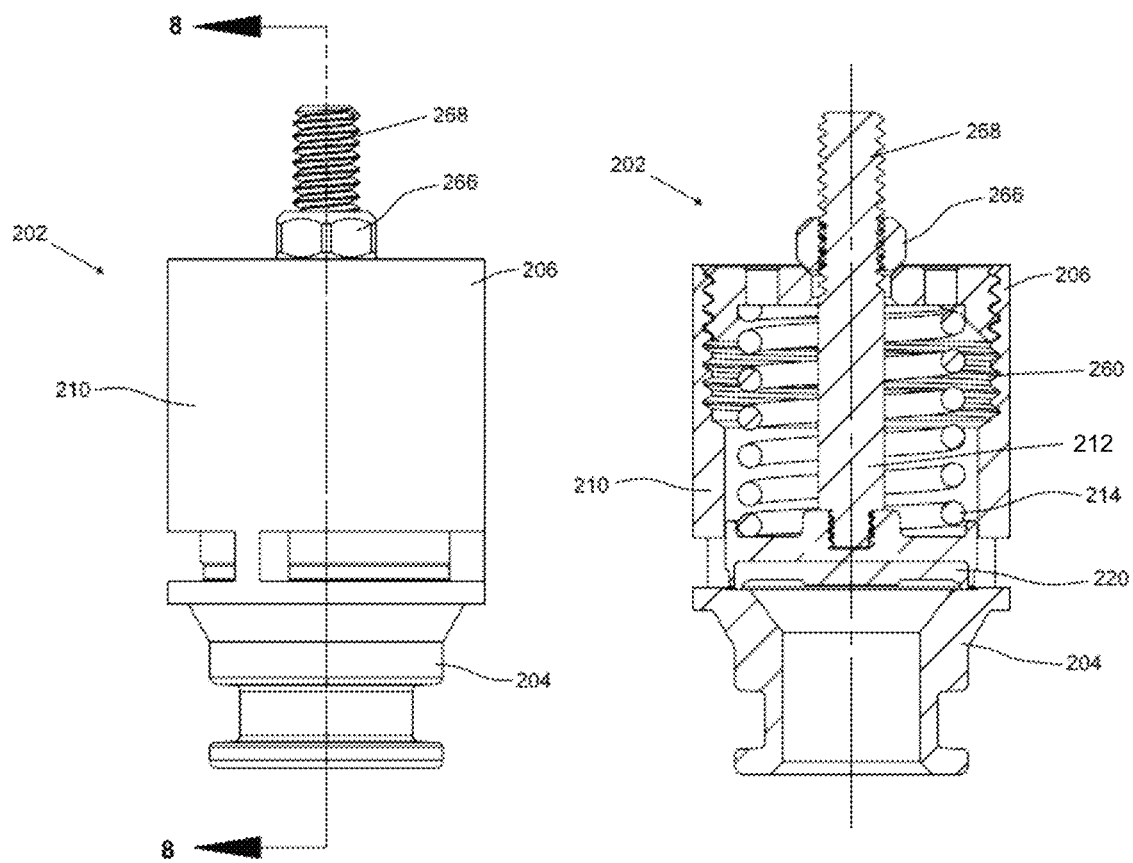
FIG. 7 is an illustration showing a top view of a second embodiment of a check valve in accordance with certain aspects of the present disclosure.
FIG. 8 is an illustration showing a section view of the valve depicted in FIG. 7 about section 8-8.

As shown in FIGS. 7-11, the valve 202 includes a valve body 210 that is similar to the valve 102 discussed above, but where the calibration wall is threaded with female threads 260. A valve core 240 is included, the valve core 240 having a set screw 262 that has corresponding male threads 264 (where the set screw 262 has openings 263 for facilitating flow through the central passage of the valve). As shown in FIG. 8, the set screw 262 may act as a spring seat, and it may be fixed relative to one end of a spring 214 such that the spring 214 is located between the set screw 262 and a sealing head 220 (which may be fixed to the valve pin 212). Thus, to install the valve core 240 within the valve body 210, the valve core 240 may be threaded into the male threads 264 such that the valve core 240 moves from a second side 206 of the valve body and towards a first side 204 of the valve body until it is appropriately located for valve operation.

An advantageous feature of the depicted valve core 240 is the ability for the assembly to be calibrated prior to being installed in the valve body 210. This is made possible via the inclusion of a calibration nut 266 and a corresponding calibration shaft 268. As shown, the calibration nut 266 includes female threads such that it is movable, via turning/screwing, relative to the male threads of the calibration shaft 268. Referring to FIGS. 8-11, for example, turning the calibration nut 266 such that it is forced towards the set screw 262 will cause the calibration nut 266 to come into contact with the set screw 262 (if not in contact already), and then force the calibration nut 266 towards the sealing head 220. This action may compresses the spring 214, thereby raising its potential energy and the force required to open the valve. Notably, when the valve 202 opens, the calibration shaft 268 calibration nut 266 may move with the valve pin 212 as the valve pin 212 moves relative to the set screw 262 and valve body 210 (e.g., where the shaft is movable through a central opening of the set screw 262).

Figures 10, 11:
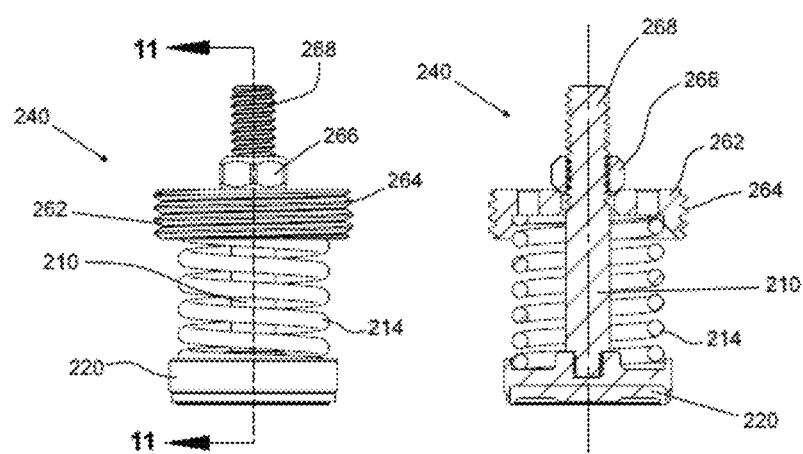
FIG. 10 is an illustration showing a top view of the valve core depicted in FIG. 9.
FIG. 11 is an illustration showing a section view of the valve core depicted in FIG. 10 about section 11-11.
Figure 9:
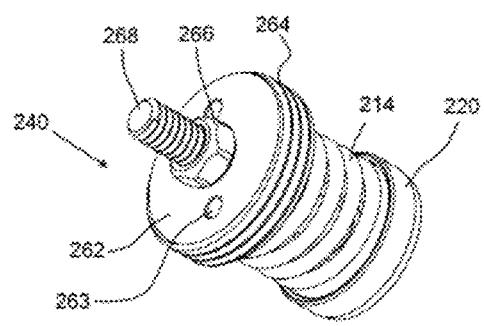
FIG. 9 is an illustration showing a perspective view of a valve core for use with the check valve depicted in FIGS. 7-8, where the valve core includes a set screw, calibration nut, and related components in accordance with certain aspects of the present disclosure.

A unique and advantageous feature of the valve core 240 of FIGS. 7-11 is that it is adjustable (e.g., to achieve different valve settings, such as different relief pressures) when the valve pin 212 is located outside the valve body 210, such as prior to installation of the valve core 240. For example, prior to placing the valve core 240 in the valve body 210, the valve core 240 may be assembled (as shown in FIGS. 10-11) and the calibration nut 266 may be tightened until a particular degree of spring compression is achieved. To illustrate, certain spring compressions may be known for corresponding locations of the calibration nut 266 along the calibration shaft 268. Alternatively or additionally, the spring compression of the spring 214 may be tested or otherwise evaluated once the calibration nut 266 is in a location believed to be suitable to confirm that the valve core 240 achieves a particular setting. The ability for such a setting to be tested outside the valve body 210 may simplify the testing procedure, thereby increasing efficiency and reliability of such testing, thereby increasing the reliability and/or decreasing the manufacturing cost of the valve 202.

An additional advantage of the present embodiment is that the setting of the valve core 240 may be altered at a later time via movement of the threaded components, which may provide adjustability of the valve 200 after it is installed in a system. For example, the valve core 240 may be adjusted during a maintenance operation, during re-calibrate the valve 200 based on valve or system wear, re-calibration based on newly-desired parameters, etc.

Notably, all embodiments herein are calibrated by positioning and/or altering a valve core, and no adjustment needs made to a valve body. Thus, it is contemplated that the valve cores described herein could be inserted into something other than a traditional valve body and still create an operational valve. For example, the valve core 140 of FIG. 4 could be pressed directly into tubing or another component (e.g., where a valve seat is included in the tubing), and the embodiment of FIG. 10 could be screwed into such a component (e.g., where threading and a valve seat are included).

While various embodiments of the present disclosure have been described, the present disclosure is not to be restricted except in light of the attached claims and their equivalents. One skilled in the relevant art will recognize that numerous variations and modifications may be made to the embodiments described above without departing from the scope of the present invention, as defined by the appended claims. Moreover, the advantages described herein are not necessarily the only advantages of the present disclosure and it is not necessarily expected that every embodiment of the present disclosure will achieve all of the advantages described.

In a first aspect, a valve may include one or more of the following: a valve body forming a central passage extending from a first side of the valve body to a second side of the valve body; a valve pin located within the central passage, where the valve pin includes a sealing head that selectively contacts a valve seat of the valve body to control flow of a fluid through the central passage; a spring having a first end that is fixed relative to the valve pin; and a spring seat that is fixed relative to a second end of the spring, where the spring is fixed relative to a calibration plunger, and where the calibration plunger is secured to a threadless calibration wall of the valve body via an interference fit.

The calibration wall may have a first side corresponding to the first side of the valve body and a second side corresponding to the second side of the valve body, where the first side of the calibration wall has a first diameter, where the second side of the calibration wall has a second diameter, and where the first diameter is smaller than the second diameter.

The calibration wall may be conical in shape.

A perimeter of the calibration plunger may have a diameter that is at least as large as a diameter of the calibration wall.

A perimeter of the calibration plunger may include a surface that is angled relative to a longitudinal direction of the valve pin when in an uncompressed state, the angled surface having a vertex facing the first side of the valve body.

The angled surface may be formed with a material that is relatively compliant relative to a material forming the calibration wall.

The calibration plunger may include a central opening, and where the valve pin extends through the central opening.

In a second aspect, a valve may include one of more of the following: a valve body forming a central passage extending from a first side of the valve body to a second side of the valve body; a valve pin located within the central passage, where the valve pin includes a sealing head that selectively contacts a valve seat of the valve body to control flow of a fluid through the central passage; a spring having a first end that is fixed relative to the valve pin; a spring seat that is fixed relative to a second end of the spring, the spring seat being configured to secure to an inner wall of the valve body; and a calibration nut configured to move relative to the valve pin, where movement of the calibration nut changes a default compression of the spring.

The valve may have a calibration shaft that extends from the valve pin and extends through the calibration nut.

The calibration shaft may include male threads that corresponding with female threads of the calibration nut.

The calibration nut may be configured to contact the spring seat and move the sealing head closer to the spring seat when the calibration nut is moved towards the sealing head on the calibration shaft.

The calibration shaft and the valve pin may be formed with a common shaft.

The spring seat may include a set screw, the set screw having male threads that correspond with female threads located on an inner wall of the valve body.

The spring seat may include at least one opening to facilitate flow through the central passage of the valve.

In a third aspect, a valve core may include one or more of the following: a spring seat; a sealing head; a spring, where a first end of the spring is secured to the sealing head and where a second end of the spring is secured to the spring seat such that compression of the spring causes a tendency for the spring seat to move away from the sealing head; a spring pin fixed to the sealing head, where the spring pin extends through an opening of the spring seat; a calibration shaft extending from the spring pin; and a calibration nut, where the calibration nut is movable along the calibration shaft towards and away from the sealing head, and where the calibration nut is configured to contact the spring seat to prevent the spring seat from moving away from the sealing head due to the tendency provided by the spring.

The spring seat may include a set screw having male threads.

The spring seat may be fixed to a threadless calibration plunger.

The calibration nut may have female threads that correspond with male threads of the calibration shaft.

Adjusting the calibration nut relative to the calibration shaft may change a default compression force of the spring.

The spring seat may have at least one opening providing flow therethrough to facilitate flow through a valve.

I claim:

1. A valve comprising:
    a valve body forming a central passage extending from a first side of the valve body to a second side of the valve body;
    a valve pin located within the central passage, wherein the valve pin includes a sealing head that selectively contacts a valve seat of the valve body to control flow of a fluid through the central passage;
    a spring having a first end that is fixed relative to the valve pin; and
    a spring seat that is fixed relative to a second end of the spring,
    wherein the spring is fixed relative to a calibration plunger, and
    wherein the calibration plunger is secured to a threadless calibration wall of the valve body via an interference fit,
    wherein the calibration wall has a first side corresponding to the first side of the valve body and a second side corresponding to the second side of the valve body,
    wherein the first side of the calibration wall has a first diameter,
    wherein the second side of the calibration wall has a second diameter, and
    wherein the first diameter is smaller than the second diameter.

2. The valve of claim 1, wherein the calibration wall is conical in shape.

3. The valve of claim 1, wherein a perimeter of the calibration plunger has a diameter that is at least as large as a diameter of the calibration wall.

4. The valve of claim 1, wherein a perimeter of the calibration plunger includes a surface that is angled relative to a longitudinal direction of the valve pin when in an uncompressed state, the angled surface having a vertex facing the first side of the valve body.

5. The valve of claim 4, wherein the angled surface is formed with a material that is relatively compliant relative to a material forming the calibration wall.

6. The valve of claim 4, wherein the calibration plunger includes a central opening, and wherein the valve pin extends through the central opening.

7. A valve comprising:
a valve body forming a central passage extending from a first side of the valve body to a second side of the valve body;
a valve pin located within the central passage, wherein the valve pin includes a sealing head that selectively contacts a valve seat of the valve body to control flow of a fluid through the central passage;
a calibration shaft that is threaded with male threads, wherein the calibration shaft extends from the valve pin;
a spring having a first end that is fixed relative to the valve pin;
a spring seat that is fixed relative to a second end of the spring, the spring seat being configured to secure to an inner wall of the valve body; and
a calibration nut configured to selectively move along the male threads of the calibration shaft, wherein movement of the calibration nut along the calibration shaft changes a default compression of the spring.

8. The valve of claim 7, wherein the calibration shaft extends beyond a terminus of the valve body in a longitudinal direction of the calibration shaft.

9. The valve of claim 7, wherein the male threads of the calibration shaft correspond with female threads of the calibration nut.

10. The valve of claim 7, wherein the calibration nut is configured to contact the spring seat and move the sealing head closer to the spring seat when the calibration nut is moved towards the sealing head on the calibration shaft.

11. The valve of claim 7, wherein the calibration shaft and the valve pin are formed with a common shaft.

12. The valve of claim 7, wherein the spring seat includes a set screw, the set screw having male threads that correspond with female threads located on an inner wall of the valve body.

13. The valve of claim 7, wherein the spring seat includes at least one opening to facilitate flow through the central passage of the valve.

14. A valve comprising:
a valve body forming a central passage extending from a first side of the valve body to a second side of the valve body;
a valve pin located within the central passage, wherein the valve pin includes a sealing head that selectively contacts a valve seat of the valve body to control flow of a fluid through the central passage;
a spring having a first end that is fixed relative to the valve pin;
a set screw forming a spring seat that is fixed relative to a second end of the spring, the spring seat being configured to secure to an inner wall of the valve body, and the set screw having male threads that correspond with female threads located on an inner wall of the valve body; and
a calibration nut located adjacent to the set screw and configured to abut the spring seat of the set screw,
wherein the calibration nut is configured to selectively move relative to the valve pin to change a default compression of the spring.

15. The valve of claim 14, further comprising a calibration shaft that extends from the valve pin and extends through the calibration nut.

16. The valve of claim 15, wherein the calibration shaft extends beyond a terminus of the valve body in a longitudinal direction of the calibration shaft.

17. The valve of claim 15, wherein the male threads of the calibration shaft correspond with female threads of the calibration nut.

18. The valve of claim 15, wherein the calibration shaft and the valve pin are formed with a common shaft.

19. The valve of claim 14, wherein the spring seat includes at least one opening to facilitate flow through the central passage of the valve.

* * * * *